United States Patent
Dogan et al.

(10) Patent No.: US 10,165,890 B2
(45) Date of Patent: *Jan. 1, 2019

(54) FILTRATION UNIT FOR USE IN MACHINE FOR PREPARING READY-TO-DRINK NUTRITIONAL LIQUIDS

(71) Applicants: Nihan Dogan, La Croix-sur-Lutry (CH); Heinz Wyss, Oberdiessbach (CH); Daniel Roland Manser, Spiez (CH); Nicolas Jean-Guy Bezet, Macon (FR)

(72) Inventors: Nihan Dogan, La Croix-sur-Lutry (CH); Heinz Wyss, Oberdiessbach (CH); Daniel Roland Manser, Spiez (CH); Nicolas Jean-Guy Bezet, Macon (FR)

(73) Assignee: Nestec S.A., Vevey (CH)

( * ) Notice: Subject to any disclaimer, the term of this patent is extended or adjusted under 35 U.S.C. 154(b) by 458 days.

This patent is subject to a terminal disclaimer.

(21) Appl. No.: 14/382,131

(22) PCT Filed: Feb. 22, 2013

(86) PCT No.: PCT/EP2013/053531
§ 371 (c)(1),
(2) Date: Aug. 29, 2014

(87) PCT Pub. No.: WO2013/127694
PCT Pub. Date: Sep. 6, 2013

(65) Prior Publication Data
US 2015/0056330 A1   Feb. 26, 2015

(30) Foreign Application Priority Data
Feb. 29, 2012 (EP) .................................. 12157454

(51) Int. Cl.
*A47J 31/06* (2006.01)
*A47J 31/44* (2006.01)
*A47J 31/60* (2006.01)

(52) U.S. Cl.
CPC ............. *A47J 31/06* (2013.01); *A47J 31/446* (2013.01); *A47J 31/605* (2013.01)

(58) Field of Classification Search
None
See application file for complete search history.

(56) References Cited

U.S. PATENT DOCUMENTS 5,143,604 A * 9/1992 Bernard ............... A47J 37/1223
210/167.28
6,202,541 B1 3/2001 Cai
(Continued)

FOREIGN PATENT DOCUMENTS

CN 101516409 8/2009
CN 101977537 A 2/2011
(Continued)

OTHER PUBLICATIONS

PCT International Search Report, dated Mar. 1, 2013, in PCT/EP2013/05351, filed Feb. 22, 2013.
(Continued)

*Primary Examiner* — Benjamin M Kurtz
(74) *Attorney, Agent, or Firm* — Dunlap Codding, P.C.

(57) ABSTRACT

Filtration unit (12) for use in a beverage preparation machine using a container for preparing the beverage; the unit being adapted to engage a container holder (3) intended to be inserted in the machine; said filtration unit comprising a filter (14) and a protective casing (12) encompassing the filter; said casing comprising an inlet wall with at least one liquid inlet (24) and an outlet wall with at least one liquid outlet (25) for delivering filtered liquid to a container lodged
(Continued)

in the container holder wherein the filter (14) is arranged in a removable manner from the casing.

19 Claims, 9 Drawing Sheets

(56) References Cited

U.S. PATENT DOCUMENTS

| | | | |
|---|---|---|---|
| 7,922,005 B2* | 4/2011 | Haladyna | B01D 29/01 210/232 |
| 8,703,219 B2* | 4/2014 | Doleac | A47J 31/407 426/115 |
| 2005/0236323 A1 | 10/2005 | Oliver et al. | |
| 2011/0041700 A1* | 2/2011 | Epars | A47J 31/06 99/295 |
| 2015/0027318 A1* | 1/2015 | Dogan | A47J 31/407 99/295 |

FOREIGN PATENT DOCUMENTS

| | | |
|---|---|---|
| EP | 2082670 | 7/2009 |
| WO | WO01/50875 | 7/2001 |
| WO | WO2004/026089 | 4/2004 |
| WO | WO2008/012314 | 1/2008 |
| WO | 2010128051 | 11/2010 |
| WO | WO 2010/128031 * | 11/2010 |
| WO | 2013127694 A1 | 9/2013 |

OTHER PUBLICATIONS

Written Opinion of the International Searching Authority, dated Mar. 14, 2013, in PCT/EP2013/05351, filed Feb. 22, 2013.
International Search Report, dated Mar. 13, 2013, in PCT/EP2013/053539, filed Feb. 22, 2013.
Written Opinion of the International Searching Authority, dated Mar. 13, 2013, in PCT/EP2013/053539, filed Feb. 22, 2013.
First Office Action for Chinese Patent Application No. 201380022525.9, dated Mar. 25, 2016.
First Office Action for Chinese Patent Application No. 201380022541.8, with English translation, dated Apr. 22, 2016.

* cited by examiner

FILTRATION UNIT FOR USE IN MACHINE FOR PREPARING READY-TO-DRINK NUTRITIONAL LIQUIDS

CROSS REFERENCE TO RELATED APPLICATIONS

This application is a national stage application filed under 35 USC § 371 of PCT/EP2013/053531, filed Feb. 22, 2013; which claims benefit to European patent application No. 12157454.5, filed Feb. 29, 2012.

FIELD OF THE INVENTION

The present invention relates to the field of the hygienic preparation of ready-to-drink nutritional liquids such as infant milk or gums. In particular, the invention relates to a system, in particular, a filtration unit adaptable to a preparation machine which utilizes containers containing ingredients adapted for the preparation of such nutritional liquids by mixing nutritional ingredients such as infant milk powder with liquid.

BACKGROUND OF THE INVENTION

An intelligently designed machine may greatly facilitate the preparation of nutritional liquids such as infant milk and may considerably reduce the preparation time for the parents or caregivers, while maintaining a fully safe delivery and a clean environment. A solution consists in providing a container containing ingredients adapted for the preparation of a nutritional delivery after the ingredients are mixed with liquid in the container. The container may be a single-portion capsule or baby bottle or any other suitable package containing a pre-metered portion of ingredients. Usually, the container is designed for being associated to a dedicated preparation machine in which liquid, such as warmed water, and the ingredients are mixed. The ingredients may be solid (e.g., a powder), liquid or jellified.

WO2010/128051 relates to a capsule and device for preparing a nutritional product; wherein the device comprises a fluid interface with a liquid injector and a gas injector for injecting, respectively, liquid then gas into the capsule; wherein the gas injector is spatially distant from the liquid injector or liquid inlet in the capsule. Gas, in particular compressed air, is injected in the capsule to empty the capsule from residual liquid and/or food. The capsule may thus be designed with a filter unit comprising a liquid inlet and a gas inlet both communicating with an outlet nozzle. The filter unit may be a separate part which is associated with the capsule at the time of use, e.g., during insertion of the capsule in the fluid supply device. For instance, the filter unit can be a part which is associated to the liquid injector or integrated in the liquid injector.

Co-pending European patent application No. 11164347.4 relates to an insert for use in a food preparation machine wherein the insert comprises a liquid separation structure for preventing liquid from entering in the gas injector of the machine and/or from spreading all over the fluid interface. In particular, the insert is arranged with a structure closing the liquid communication from the liquid passage to the gas injector area.

Co-pending European patent application No. 11185427.9 relates to a filter cap for filtering and dispensing a nutritional composition. The cap is connected to a container containing a predefined amount of nutritional formula base for the preparation of a ready-to-drink aqueous nutritional formula composition.

WO2010/128051 contemplates a liquid filtering solution in which the filter unit is made separable from the capsule. An advantage is essentially that lower-cost capsules can be used in the machine whereas the filter unit can be re-used several times. However, its integration to the machine is complicated because the access to the liquid injector is uneasy. Therefore, it is practically difficult to provide a solution that can be installed conveniently and periodically. A second problem is that the filter unit is a complex element involving many pieces thereby requiring complex assembling lines. Therefore, it makes it an expensive spare part.

The present invention aims at proposing a solution alleviating the disadvantages of the prior art. In particular, the invention provides a solution for reducing the amount of disposable material of the system while maintaining a satisfying level of hygiene. The invention also provides a solution for reducing the complexity and the cost of the portioned containers while maintaining a satisfying level of hygiene during the preparation of the nutritional composition. The invention also provides more flexibility at a lower cost to adapt the size of the filter in relation to the filtering needs, such as the amount of liquid to be filtered. As a result significant filter material savings can be obtained. The invention also provides a solution for improving the user convenience and reducing the time for preparing a ready-to-drink liquid.

OBJECT AND SUMMARY OF THE INVENTION

The present invention is defined according the appended claims.

The invention relates to a filtration unit for use in a nutritional liquid preparation machine using a container for preparing the beverage. The filtration unit is adapted to engage a container holder which is intended to be inserted in the nutritional liquid preparation machine. The filtration unit comprises a filter and a protective casing encompassing the filter. The casing comprises an inlet wall with at least one liquid inlet and an outlet wall with at least one liquid outlet for delivering filtered liquid to the container when positioned in the container holder. The filter is further arranged in a removable manner in the casing.

The term "container" refers to any container containing an amount of nutritional ingredients in a mixing chamber adapted for being fed with liquid supplied from the preparation machine. Preferably, the container is a single-use capsule containing a pre-dosed amount of ingredients having an inlet side for receiving filtered liquid and a delivery side for delivering the mixed (ready-to-drink) nutritional liquid. Optionally, the container can be a baby bottle or a liner to be placed or placed in a baby bottle and containing nutritional ingredients.

In a preferred mode, the filter comprises a filter media associated to a reinforcement support.

The term "filtering media" covers any suitable sort of filtering material capable of filtering liquid in order to remove life contaminants or contaminant of organic origin, in particular, microorganisms such as bacteria. A preferred filtering media is a micro-porous membrane. Preferably, the micro-porous membrane has a pore size of less than 0.4 microns, most preferably of less than 0.2 microns. Preferably, the membrane has a thickness less than 500 microns, preferably a thickness comprised between 10 and 300 microns. The size (i.e., the filtering surface area) of the filtering media can be adapted to the amount of liquid to be filtered. In particular, the larger the amount of filtered liquid needed, the higher the size of the filtering media. The material of the membrane can typically be chosen from the list consisting of PES (polyethersulfone), cellulose acetate, cellulose nitrate, polyamide, polyester and combinations thereof.

The reinforcement support strengthens the filter media. In particular, when the filter media is a thin membrane, the support increases the rigidity and tear strength of the filter. It can thereby ensure a better integrity for an optimal filtering efficiency and prevents the filter from being damaged (e.g. torn) or permanently distorted during use in the machine or during its insertion in the casing.

More preferably, the reinforcement support is placed against the outlet side of the filter media. The support has preferably a higher rigidity in flexure than the filter media, e.g., a micro-porous membrane. Therefore, it reduces the possible deflection of the filter media, in particular, under the pressure of liquid. An excessive deflection could modify the filtering conditions such as by causing an enlargement of the opening surface area of the filter and/or causing its breakage. The reinforcement support prevents such possible distortion of the filter media that would negatively affect the filtering properties of the filter.

Preferably, the casing is formed by a first cover forming the inlet wall and a second cover forming the outlet wall, said first and second covers being at least partially detachable one another to enable the filter to be placed in a dedicated compartment of the casing. Contrary to the filter, the casing is intended to be re-used as many times as possible. The first and second covers are made detachable by non-permanent connection means securing the covers in closure. The casing can be made in durable material such as hard food grade plastic such as PP or PE. The casing can be cost-effectively produced by injection moulding or other equivalent moulding techniques.

More preferably liquid-tight sealing means are arranged in the casing to ensure a liquid-tight sealing arrangement between the inlet side of the filter and the outlet side of the filter. In particular, liquid-tight sealing means, such as an O-ring and the like, can be arranged between the filter and the casing. The sealing means may preferably be attached to the support of the filter so that it is renewed each time the filter is exchanged by a new one in the unit. The sealing means can be made of rubber (e.g. silicone or EPDM), soft plastic (e.g. PP, PE), cellulose, natural or synthetic fibres, starch material or combinations thereof. Alternatively, the sealing means is part of the casing.

In a preferred example, the covers are open-able in the manner of a "clam shell" to uncover a dedicated compartment for the insertion of the filter. For this, the first and second covers are guided one another in opening of the casing by a hinge. The first and second covers can be guided one another by another transversal and/or rotational connection means enabling the opening of a filter compartment in the casing. The first and second covers can be secured in closure together by means of a releasable latch. The latch can be arranged to be locked and released in a resilient manner only by the user's manual effort applied thereon. In a particular mode, the latch can be formed by at least one relief provided on the first cover which engages at least one recess provided on the second cover (or vice versa). Of course, other latching systems can be envisaged to provide a similar locking function without departing from the scope of the invention. For example, it can be a quarter-turn screw-type system or a spring-biased clamp acting in compression against the covers in closure. The hinged connection of the covers is preferably located on one side of the casing and the latch is located on the opposite side or its vicinity. The hinged connection can be designed to allow an opening of the covers such as a "clam shell" according to a predefined angle, for example, between 45 and 360 degrees. The hinged connection is not necessarily a pivot but may be a more complex articulation which authorizes a rotational and axial displacement of one cover relative to the other. The connection may as well be a linear sliding connection allowing one cover to slide relatively to the other in order to uncover a dedicated compartment for the removable filter.

In another mode, the casing comprises an open window arranged to slidably receive the filter therein. In such arrangement, the casing can be formed of covers assembled by a permanent connection. Such permanent connection is meant to be a connection which is not intended to be violated by the user such gluing, ultrasonic or heat welding, riveting, possibly (also less preferably) screwing and combinations thereof.

Preferably, the liquid outlet comprises a perforating member protruding from the outlet wall. The perforating member enables to provide a liquid inlet through the container, e.g., through a sealing membrane of a single-use capsule, for allowing the filtered liquid to be fed in the container. Preferably, the perforating member ends by a liquid outlet of small diameter to form a high-velocity jet of liquid inside the capsule. A liquid jet will promote the dispersion of ingredients which may otherwise typically form lumps or globules in presence of water such as fat containing powders and the like. Preferably, the liquid outlet comprises a single opening having a diameter of less than 1.0 mm, more preferably between 0.2 and 0.7 mm. The outlet is capable in normal flow rate conditions in the machine to deliver a flow velocity comprised between 1 and 20 meter/second. The jet created by the outlet produces a turbulent flow in the container which is effective for dissolving and/or dispersing the whole content of the ingredients in the container thereby ensuring each time an accurate feed for the infant.

Preferably the inlet wall of the casing also comprises a gas inlet for receiving a gas injector of the beverage machine; such gas inlet being axially offset relative to the liquid inlet and being in fluid communication with the liquid outlet. The gas inlet is thus placed in the unit to bypass the filter. In other words, gas is not injected through the filter but directly through the liquid outlet. The gas inlet enables the introduction of gas under pressure (in general compressed air) for emptying the container from residual liquid if necessary without risk of damaging the filter. This ensures that the full content of the container is well and safely delivered and therefore the full food intake is made available for consumption.

Preferably, the filter is housed in a dedicated compartment of the casing which is axially offset relative to the axis of the liquid outlet. The liquid outlet is generally positioned above the large housing of the container holder. Such configuration enables to displace the filter away from the centre of the housing of the container holder in order to reduce the possible deformation of the filter and/or prevent the risk of the filter collapsing in the container.

The invention further relates to a combination of a container holder and a filtration unit, as aforementioned, wherein the container holder comprises a housing dedicated for receiving the filtration unit therein and wherein the casing of the filtration unit is sized and dimensioned to complementarily fit in the said housing in a moveable or removable manner.

In a first mode, the said combination is arranged in such a manner that the filtration unit and the container holder are separable. In a second mode, the said combination is arranged in such a manner that the filtration unit is connected to the container holder in a moveable manner.

The benefit for such configurations is essentially that the filtration unit can be positioned in a convenient manner by simple insertion of the container holder before each cycle of preparation of a serving of nutritional liquid. This removes the need for the difficult access to the fluid interface of the device by the user.

Preferably, the filtration unit is connected to the container holder to be movable between a first position in which the container receiving seat of the holder is uncovered for enabling the loading and unloading of the container in the container holder (i.e., "container ejection position") and a second position in which the container receiving seat is covered for enabling the liquid outlet of the unit to be positioned at the inlet side of the container when a container is present in the container holder (i.e., "closed operational position").

As a result, an easy withdrawal of the container is made possible after use while the filtration unit remains affixed to the container holder. This configuration removes the complexity of the system and maintains the number of separate pieces at a bare minimum.

More preferably, it comprises a latch to releasably secure the filtration unit in the second position. The latch preferably comprises an engaging portion of the filtration unit and a complementary engaging portion of the container holder; at least one of which being resiliably movable in disengagement relative to the other such as by means of an actuation member. In a preferred design, the latch extends by an actuation member placed at or close to the handle of the container holder. As a result, the actuation of the disengagement of the filtration unit by the user can be greatly facilitated thereby enabling the ejection of the container off the holder after use.

The invention further relates to a filtration kit comprising: a series of filters and at least one casing for enabling the constitution of a filtration unit for use in a nutritional liquid preparation machine using a container for preparing the beverage; the filtration unit being adapted to engage a container holder intended to be inserted in the machine; said filtration unit being obtained by the arrangement of a filter selected from the series of filters in the casing ; said casing comprising an inlet wall with at least one liquid inlet and an outlet wall with at least one liquid outlet for delivering filtered liquid to the container in the container holder wherein each filter of the series is arranged in a removable manner in the casing thereby allowing the user to select one filter within the series for its arrangement in the casing and the filtering surface area of the filters differ within the series.

The term "series of filters" means at least two filters. The term "filtering surface area" refers to the surface area of the filter media effective for filtering liquid measured in the direction transverse to the flow direction passing through the filter. For example, when the filter media is a micro-porous membrane the surface area is given by the surface of the membrane which is exposed to the liquid flow.

Therefore, the kit enables to adjust the filtering properties to the amount of liquid that needs to be filtered. In particular, the filtering area may be reduced within the series of filters as a function of: (a) the size of the container and/or (b) the amount of ingredients contained in the container and/or (c) the volume of nutritional liquid delivered.

The invention further relates to the use of a container in a combination of a container holder for the preparation of a nutritional liquid and a filtration unit, as aforementioned, wherein the container has a body containing nutritional ingredients; said body being sized to fit in the container receiving seat of the container holder; the container and comprising a top wall adapted for being sealingly engaged by the filtration unit.

The appended drawings are given as a matter of non-exhaustive illustration of the preferred embodiments.

DETAILED DESCRIPTION OF THE DRAWINGS

Figure 1:
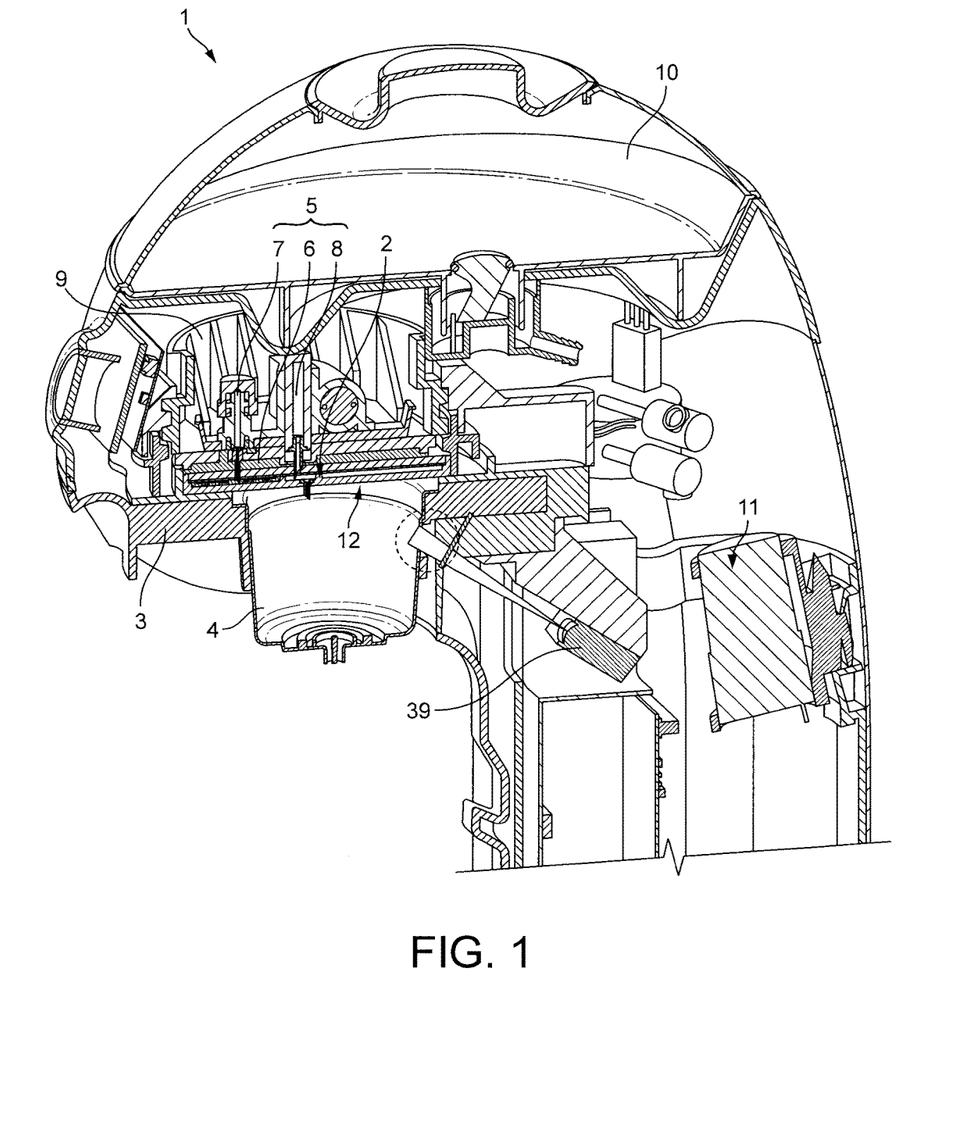
FIG. 1 shows a detailed cross section view of a preparation machine of the invention with a container affixed thereto.

A nutritional preparation machine 1 is illustrated on FIG. 1. The machine typically comprises a housing 2 for receiving a container holder 3. The container holder is preferably fully or partially removable from the housing. The container holder comprises a seat for receiving a container 4 filled with nutritional ingredients. In the present case, the container holder is configured as a drawer to be inserted in the housing along guiding means of the machine (not shown) such as described in co-pending European patent application No. 11152739.6 entitled: "Beverage production machine comprising features to facilitate capsule loading". The container 4 may be a single-use capsule which contains a predetermined amount of nutritional ingredients, such as infant formula powder. The capsule can be formed of a cup-shaped body which is closed by a top perforable sealing foil.

The housing further comprises a fluid supplying interface 5. The interface may comprise an engagement plate 6 from which a liquid injector 7 and a gas injector 8 protrude beyond the bottom surface of the plate 6 in direction of the container 4. The liquid injector 7 is required for feeding an appropriate amount of liquid in the container so that liquid can mix with the nutritional ingredients for preparing the nutritional liquid portion such as a portion of infant milk. The liquid injector 7 may comprise a hollow needle protruding outwardly from the plate to be able to perforate, if necessary, the sealing foil of the container.

The liquid injector 7 is thus supplied with liquid from a liquid reservoir 10. Liquid is typically water for being mixed with nutritional ingredients in the container which can be, for instance, a powder, a liquid extract or a gel. Liquid is supplied to the injector after being warmed in a heater (not shown) and is pressurized by a pump 11. The gas injector 8 is arranged to supply gas into the container in order to empty it from residual nutritional liquid at the end of the preparation cycle, in particular, once the pump supplying liquid to the container is stopped. Gas it typically compressed gas provided by an air pump or a compressed-gas cartridge in the machine (not shown). The gas injector may also comprise a hollow needle protruding from the plate or be a simple hole. The liquid and gas injectors are axially distant one another at the fluid supplying interface. Such distance is preferred to be able to have the liquid injector be located close to the front of the housing.

The fluid supplying interface is mounted on a frame 9 in a reciprocal manner between a retracted position allowing the container holder 3 to be inserted in the housing and a position in which the fluid supplying interface 5 is engaged against a filtration unit inserted between the interface and the container (called hereafter "liquid/gas feeding position") as will be described later in more detail. The fluid supplying interface 5 can be moved from the container holder loading position to the liquid/gas feeding position by mechanical and/or motorized activating means (not shown).

Figure 2:
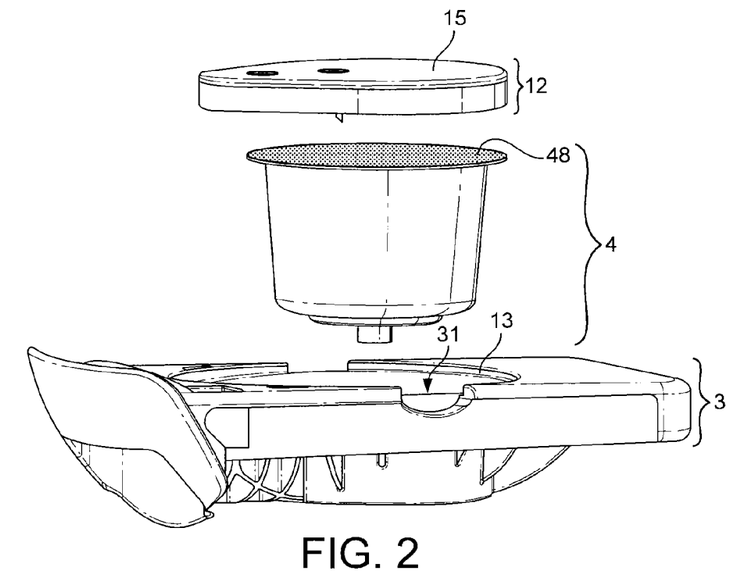
FIG. 2 shows, in perspective exploded view, a container holder, a container (containing nutritional ingredients) and a filtration unit according to a first embodiment of the invention.
Figure 3:
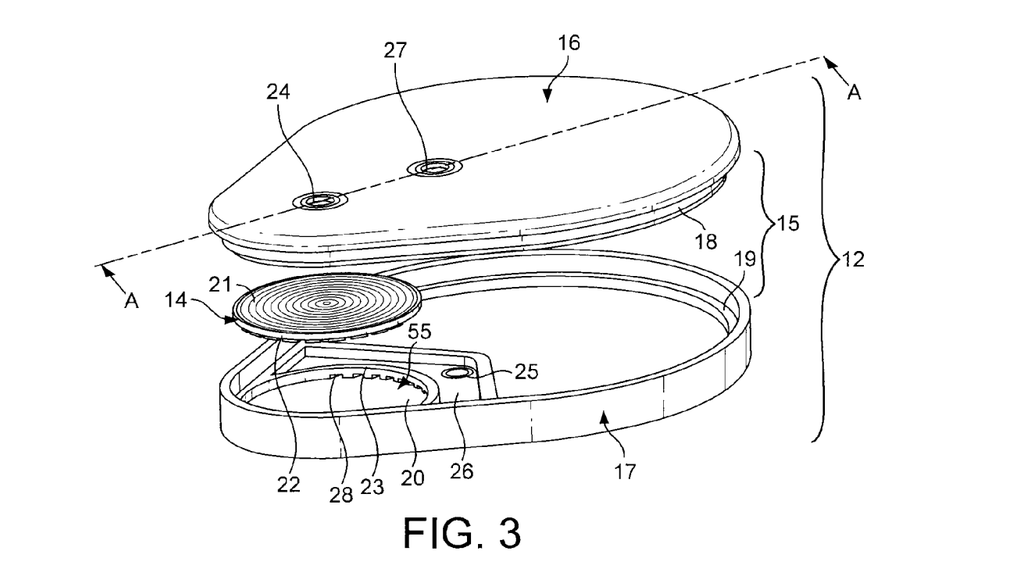
FIG. 3 shows, in perspective exploded view, a filtration unit according to the embodiment of FIG. 2.
Figure 4:
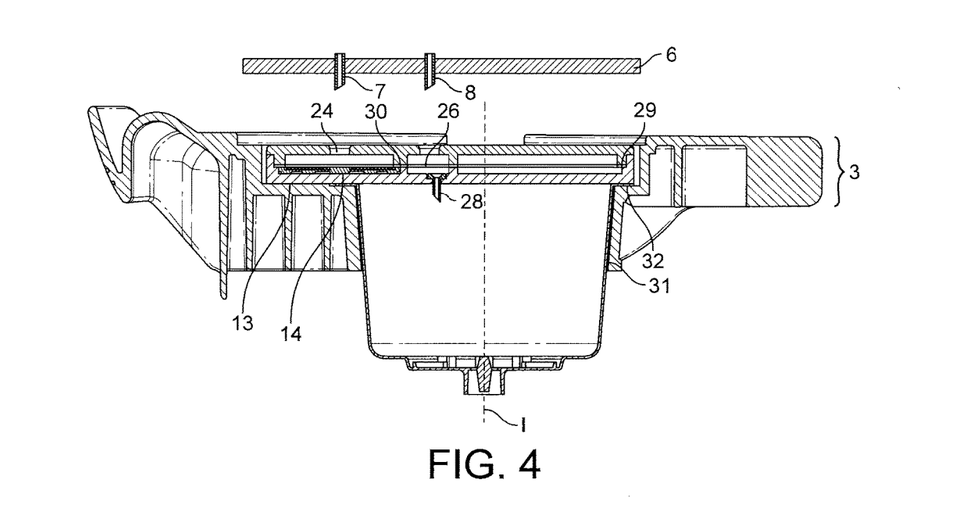
FIG. 4 shows, in longitudinal cross-sectional along axis A-A view, a container holder with a filtration unit holding a container and a fluid injection interface of the machine before engagement of the latter on the filtration unit.

FIGS. 2 to 4 illustrate a first mode of a filtration unit 12 of the invention. FIG. 2 shows the assembly formed by a container holder 3, a removable container 4 such as a single-use capsule containing nutritional ingredients and a removable filtration unit 12. In this example, the filtration unit 12 is a stand-alone element which can be placed on top of the capsule in a dedicated housing 13 of the container holder. As more visible in FIG. 3, the filtration unit 12 comprises a removable filter 14. For this, the filtration unit 12 comprises a protective casing 15 formed of a first and second covers 16, 17. The first cover 16 forms the inlet wall, whereas the second cover 17 forms the outlet wall. Both covers are connected together in a detachable manner. For instance, the first and second covers comprise complementary edge means 18, 19 which engage each other in closure of the casing. Such edge means 18, 19 form, for instance, complementarily-shaped circumferential edges which, when in friction or press-fitting engagement, permit a sufficient connection and demarcate a liquid-tight interior of the casing along the edges. Additional liquid-tight sealing means can be associated to the edges such as a rubber lining 29.

The casing demarcates a dedicated filter compartment 20 enabling the placing in a dedicated position of the removable filter 14. The filter 14 is preferably formed of a filter media 21 and a filter reinforcement support 22. The filter media can be, for instance, a micro-porous filter membrane, which is designed to remove contaminants from liquid injected in the filtration unit at the inlet side. The filter reinforcement support 22 has rigidity in flexure which is much higher than the filter media. The function of the support is essentially to enable a proper handling of the filter during insertion and removal from the casing, as well as maintaining the integrity of the filter media under liquid pressure during liquid filtration. The support can be bound to the membrane at least at its outlet side. It may have a grid structure or a similar aperture reinforcing rigidifying structure. Through-apertures in the support are necessary to allow liquid to freely traverse while reducing as much as possible unnecessary pressure loss. Furthermore, outwardly oriented channels can also be provided at the bottom of the support to allow liquid to be collected towards the periphery of the filter. The support can, for instance, be made of food grade plastic and/or rigid cardboard. The support could as well be arranged to cover both the inlet and outlet sides of the filter media, as a sandwich-type structure, in order to prevent direct contact of human fingers with the filter media.

The filter 14 can be given any suitable shape such as a disc shape as illustrated in the figures or any other form such as polygonal, rectangular, square, etc. The filter compartment 20 is so complementary shaped with a positioning wall 23 to facilitate the insertion of the filter in a relatively fixed and predetermined position. The compartment 20 is arranged in upstream communication with a liquid inlet 24 provided on the first cover. The distance between the filter 14 and the liquid inlet 24 is sufficiently large to prevent the liquid injector 7 from contacting the filter (FIG. 4). In a possible design (not shown), the liquid inlet can extend inwards the compartment by a grid-like structure which protects the filter against any risk of puncture. The filter compartment 20 is in communication downstream with the liquid outlet 25. The liquid outlet is formed in the second cover 17 forming the outlet side of the filtration unit. Between the filter compartment 20 and the liquid outlet 25 can be formed a second compartment 26 in communication with an upstream gas inlet 27 also provided in the first cover 16. The liquid inlet 24 and gas inlet 27 are transversally distanced (or axially offset) one another and separated by wall means of the casing such as the position wall means 23 through which are provided transversal apertures 55 allowing liquid transfer from the first compartment downstream the filter to the second compartments in its way to the liquid outlet 25. As noticeable, the gas inlet 27 is so placed to enable a direct communication with the liquid outlet 25 without passing through the filter. This configuration reduces the risk of damaging the filter and it also reduces a too high gas pressure resistance in the filtration unit. It is also worth noticing that this configuration enables to provide a filter which is transversally offset relative to the central axis I of the container 4 (FIG. 4). This arrangement enables to have the filter be better supported on the side of the container holder.

The size of the filter 14 may be varied depending on the amount of liquid to be filtered. In such case, the size of the compartment can be varied accordingly or be designed in such a manner to be able to accommodate a number of different filter sizes. The filter may also be given the same size but the size of the filter media be varied. For example, the support remains of the same diameter and the filter media is varied in size onto the support. Therefore, a series of different filters can be envisaged to better adapt the filtering properties of the filtration unit to the liquid amount.

Upstream the filter 14, i.e., between the liquid inlet and the inlet side of the filter, the filter compartment 20 can be made liquid-tight around the filter media, thanks to a sealing member such as a rubber lining 30 inserted between the two covers. The lining 30 can be applied onto the edge of the demarcating wall of the compartment on the inside of the first cover 16. Of course, the lining 30 may alternatively or additionally be applied on the upper edge of the positioning wall 23 of the second cover 17. The lining 30 may also be integral with the lining 29.

The liquid outlet of the filtration unit 12 is preferably provided with a perforating member 28 such as a hollow needle. The perforating member 28 protrudes externally from the second cover towards the container 4 when the unit is in position in the container holder 3. The filtration unit is positioned in such a manner that the perforating member 28 perforates a sealing foil 48 of the container. Filtered liquid can thus be injected in the container directly by the filtration unit. The risk of contamination of the filtered liquid is therefore reduced to minimal.

As illustrated in FIG. 4, the container holder 3 has a receiving seat 31 which is conformed in dimension and shape to the container. The container preferably comprises an outwardly peripheral protruding rim 32 which enables to maintain the container in a stable position in the holder. The holder is further designed with the dedicated housing above the seat 31, which extends both axially and transversally beyond the seat 31, to provide a complementarily shaped room for receiving the filtration unit. When the stand-alone filtration unit 12 is inserted in position in the housing 13, its protruding perforating member 28 engages the container. The fluid supplying interface of the machine comprising the engagement plate 6 can be moved towards (e.g., downwards) the filtration unit thereby resulting in the liquid injector sealingly engaging in the liquid inlet 24 and the gas injector sealingly engaging in the gas inlet. The sealing between the injectors and the filtration unit can be obtained by providing the plate 6 with an elastic (e.g. rubber) lining or by providing a soft or elastic sealing member localized on the casing 15 around the liquid and gas inlets and/or on the plate 6 around the liquid and gas outlets.

A second mode is illustrated on FIGS. 5 to 12. For simplification, the same references are used to designate the same technical means. In this embodiment, the filtration unit 12 is hingedly affixed to the container holder in such a manner that the unit can move between a first position in which the container receiving seat 31 of the holder is uncovered for enabling the loading and unloading of the container 4 in the container holder (i.e., "container ejection position") and a second position in which the container receiving seat is covered for enabling the liquid inlet of the unit to be positioned at the inlet side of the container when a container is present in the container holder (i.e., "closed operational position"). The container loading and ejection positions are respectively apparent in FIGS. 5, 11 and 12. The closed operational position is apparent in FIGS. 8 and 9.

Figure 5:
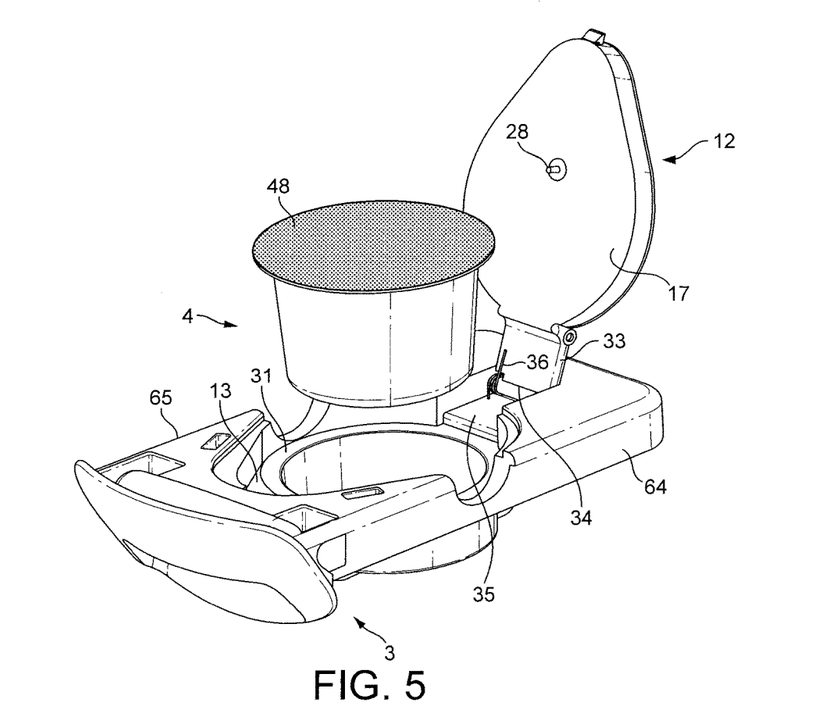
FIG. 5 shows, in perspective view, a container holder with a filtration unit according to a second mode in a loading mode of the capsule.
Figure 8:
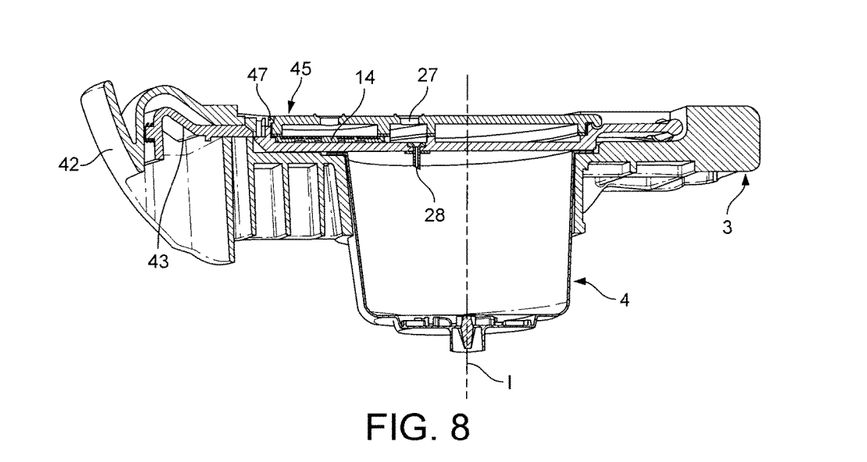
FIG. 8 shows in perspective cross sectional view along axis A-A of the unit of FIGS. 6 and 7, an assembly ready for insertion in a preparation machine, comprising a container holder, a container and a filtration unit in closed operational position.
Figure 10:
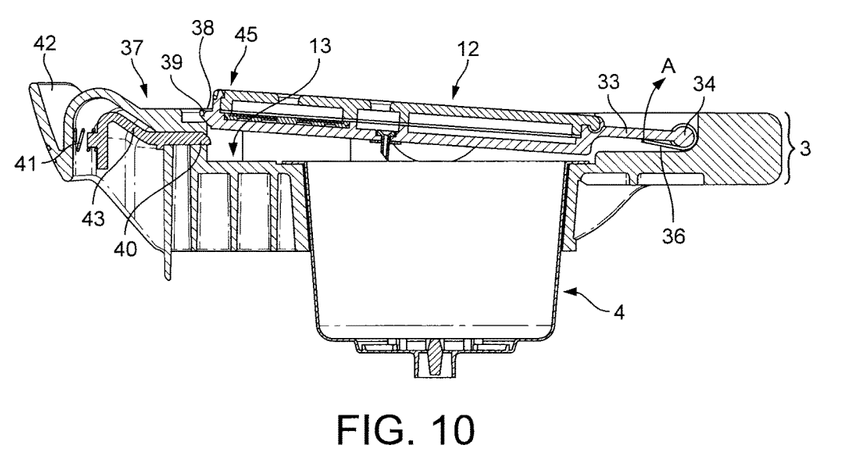
FIG. 10 shows, in cross sectional view along axis A-A of the unit of FIGS. 6 and 7, an assembly comprising a container holder, a container and a filtration unit moving from the closed operational position to the container ejection position.
Figure 11:
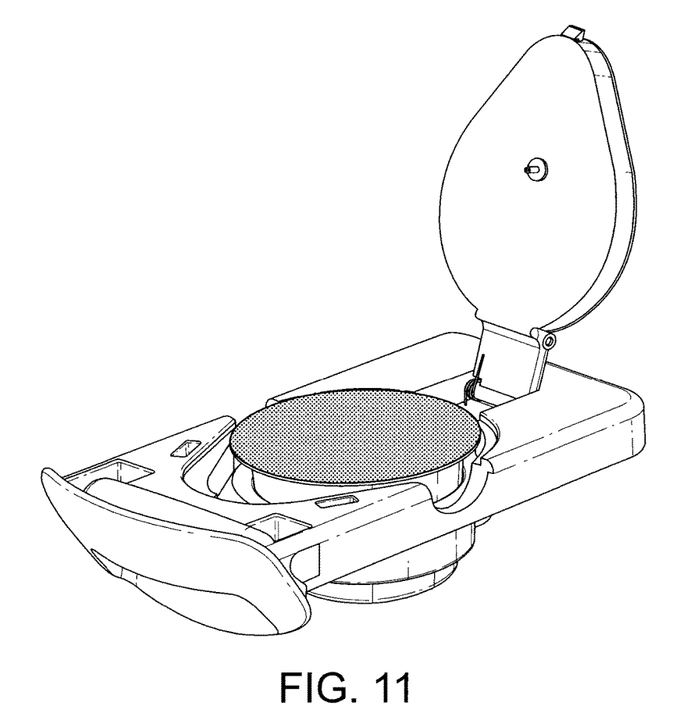
FIG. 11 shows, in perspective view, the filtration unit of FIG. 10 in the container ejection position.
Figure 12:
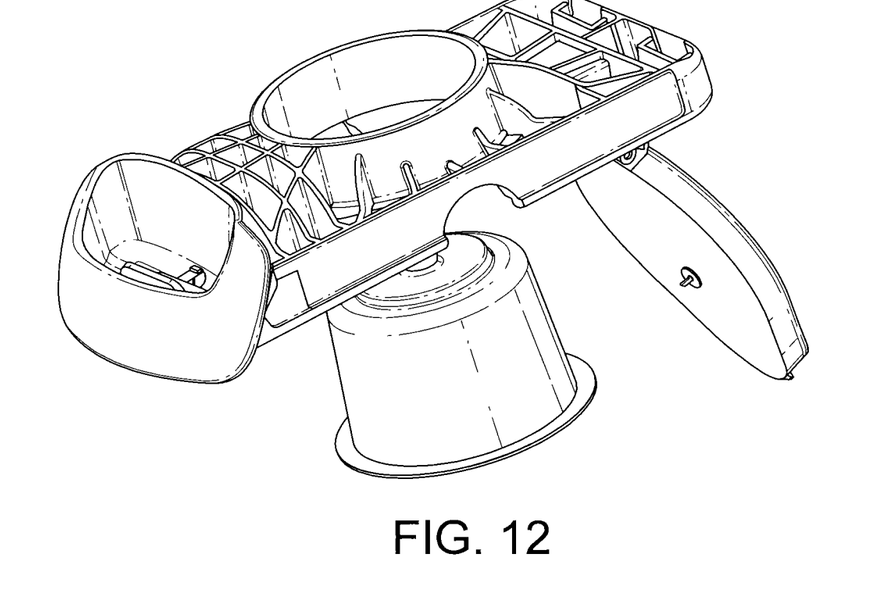
FIG. 12 shows the ejection of the container from the container holder in the container ejection position when the container holder is simply turned up-side-down.

As illustrated on FIGS. 5 and 10, the filtration unit 12 comprises a rear extension 33, extending from the second cover 17 of the casing, which is rotatably mounted via a hinge 34 to the container into a recess 35 of the holder. The term "hinge" is to be taken as covering a pivot or rotational connection taken as such or combined to one or more translational degree of freedom to form a more complex articulation. Such configuration enables the casing to be rotated from the container ejection position illustrated, e.g., at a close to vertical angle, to the engaged closed operational position in which the filtration unit occupies the dedicated housing 13. A spring 36 can be associated to the hinge 34 in the recess in order to bias the unit towards the container ejection position. The filtration unit is furthermore kept in closed operational position by means of a releasable latch 37 (FIG. 10). As a matter of example, the releasable latch 37 can comprise, on the filtration unit, a recess 38 formed on the front side of the casing such as formed by a ramp-shaped tooth 39 and, on the holder, a relief 40 forming a second ramp-shaped tooth which retracts under the effect of a resilient means such as a spring 41 lodged in the handle 42 of the container holder. The relief 40 can extend by an arm 43 guided through an opening of the container holder, thereby forming an actuation member. At rest, the arm is pushed by the spring 41 to maintain the relief 40 in extended position. When the filtration unit is pushed in the dedicated housing 13 in closed operational position, the tooth 39 of the unit pushes the tooth 40 which retracts in the holder by compressing the spring 41. In the fully lodged position of the unit in the holder, the tooth 40 is urged back by the spring to engage the recess 38 and consequently locks the tooth 39 (FIG. 8). For releasing the latch 37, it suffices to actuate the actuation member 43 to retract the tooth 40 against the compression force of the spring 41. This causes the filtration unit to eject in opening direction A by effect of the spring 36 placed at the hinge 34. Once the latch is released, the container holder can be placed up-side-down to eject the container which falls by gravity from its seat 13 (FIG. 12).

Figure 6:
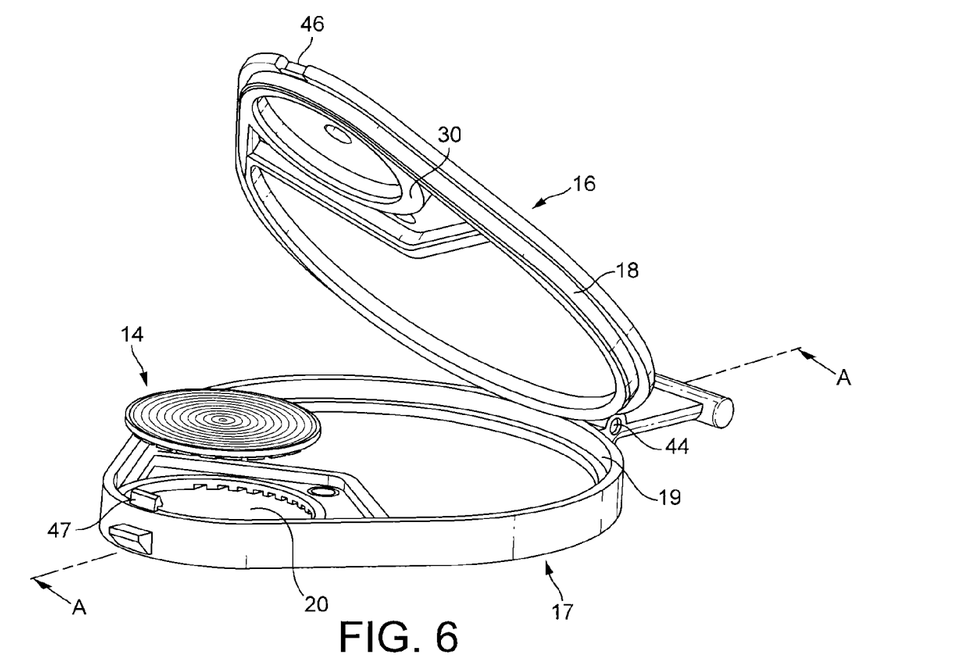
FIG. 6 shows in perspective view (from a top angle), a filtration unit in open configuration for exchange of the filter in the unit.
Figure 7:
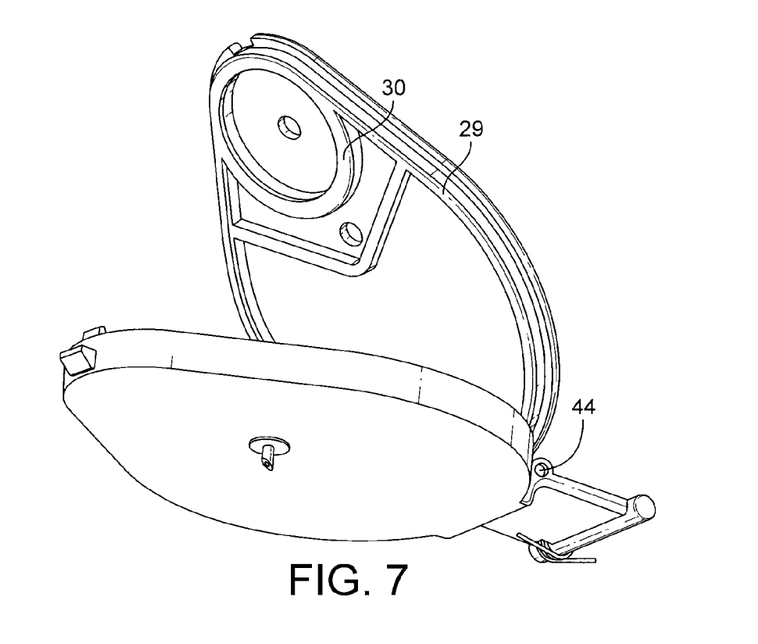
FIG. 7 shows in perspective view (from a bottom angle), a filtration unit in open configuration for exchange of the filter in the unit.

FIGS. 6 and 7 illustrate in more detail the filtration unit in opening for allowing the exchange of the removable filter 14. Contrary to the preceding mode, the first and second covers 16, 17 of the casing are only partially detachable. More particularly, the first and second covers can be detached at their engaging peripheral edges to leave the cavity of the casing open, in particular, for giving access to the dedicated filter compartment 20 to a removable filter 14. The first and second covers are further connected by an hinge 44 to prevent the full separation of the covers. A rubber lining is also present on at least one cover to provide a liquid-tight closure of the casing.

Of course such hinge can be any sort of suitable articulation which is not necessary a pure rotating pivot but may be a translational and/or rotational guiding means of the two covers 16, 17. For instance, the hinge could be a sliding means enabling the first cover 16 to slide relative to the second cover 17 between open and closed positions of the compartment 20.

Figure 9:
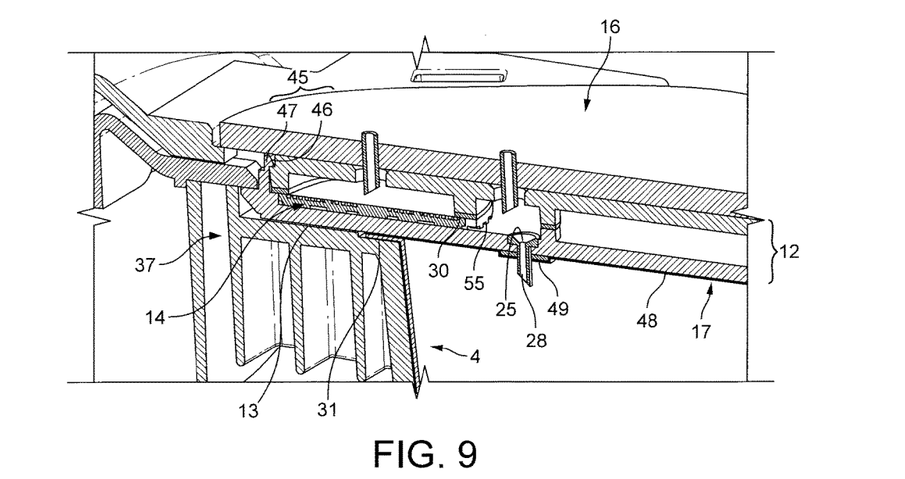
FIG. 9 shows in detailed perspective and cross sectional view, the engagement of the filtration unit with the fluid interface of a nutritional preparation machine.

In the present mode, the first and second covers of the casing are securely locked together by means of a non-permanent connection, in particular, a releasable latch 45 (FIGS. 8 and 9). The releasable latch can be a combination of a recess 46 formed in the first cover 16 and a relief 47 formed in the second cover 17 (or vice versa). The relief 47 is shaped to engage in the recess in a spring-biased fashion, such as by making the relief sufficiently elastic. The latch can be manually disengaged by applying a sufficient pulling effort on the cover. Of course, other equivalent releasable latching means are possible to sealingly close the casing along its peripheral engaging edges.

FIG. 9 illustrates the second mode of the filtration unit 12 when in engagement in the preparation machine with a container 4 in position in the holder. The perforating member 28 of the filtration unit perforates in engagement the sealing foil 48 of the container. A sealing means 49, such as a rubber O-ring, is further present about the perforating member to provide a sufficient liquid tightness at the liquid injection site and therefore to prevent resurgence of liquid between the container and the filtration unit.

Figure 13:
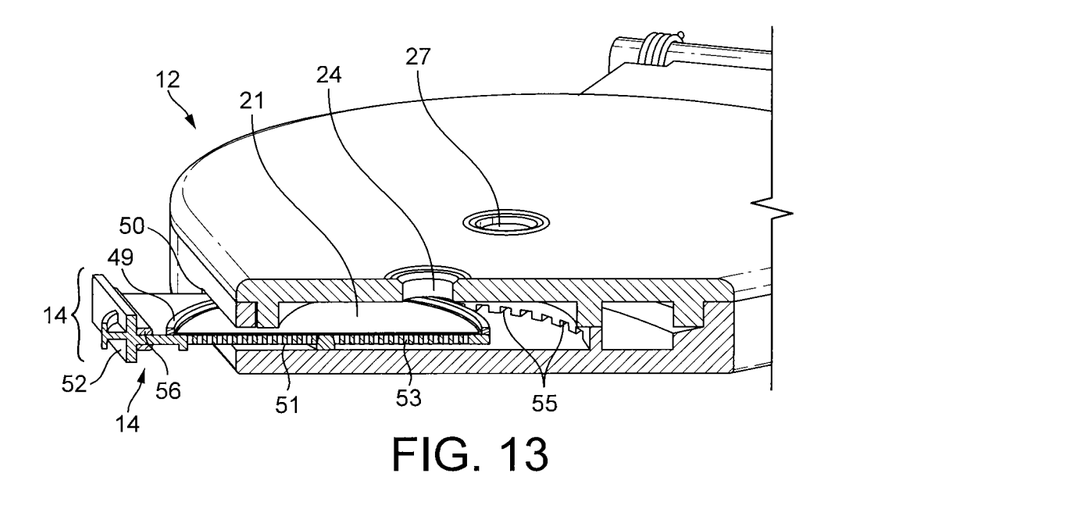
FIG. 13 shows, in detailed perspective and cross-sectional view, a filtration unit according to a third embodiment.
Figure 14:
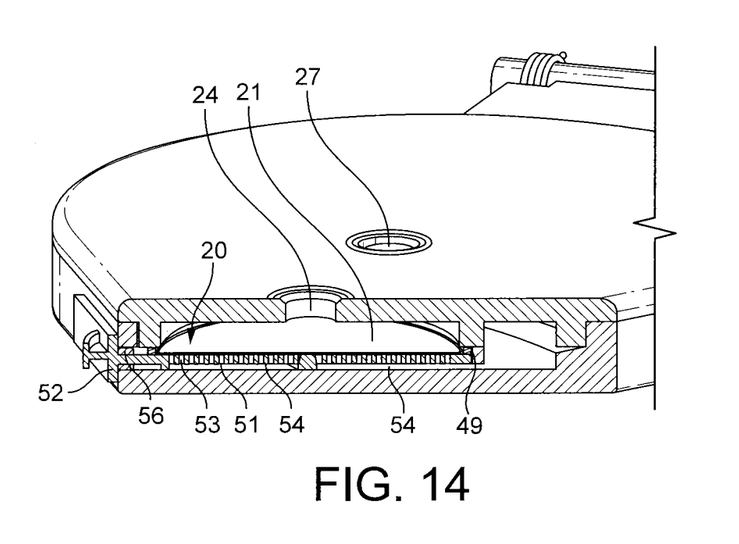
FIG. 14 shows, in detailed perspective and cross-sectional view, the filtration unit of FIG. 13, with the filter being operationally in place in the unit.

FIGS. 13 and 14 illustrate a third possible mode of the filtration unit 12 of the invention in which the removable filter 14 is a drawer which can be inserted in sliding relationship through an open window 50 of the casing. For example, the reinforcement support is formed in one piece with a grid portion 51 and a sealing door 52. The grid portion 51 has a plurality of through passages 53 for the axial flow of the filtered liquid and channels 54 for the radial flow of the liquid towards the liquid passages 55 of the compartment 20. The grid portion is covered by a filter membrane 21 which can be sealed at its periphery onto the grid portion. The membrane is bordered by a sealing member 49 such as an O-ring which is affixed onto the surface of the support and/or filter membrane. The sealing member is positioned in correspondence with demarcating walls of the compartment pertaining to the first cover such that the compartment is made liquid-tight between the liquid inlet 24 and the filter. An additional liquid tightness can be obtained by a sealing member 56 positioned between the window 50 and filter. In particular, it is particularly suitable to provide a resilient sealing member on the sealing door or have the sealing door made itself of a resilient material such as rubber or soft plastic. Therefore, filtered liquid is prevented from leaking from the open door when the filter is sufficiently slidably engaged in the casing.

Figure 15:
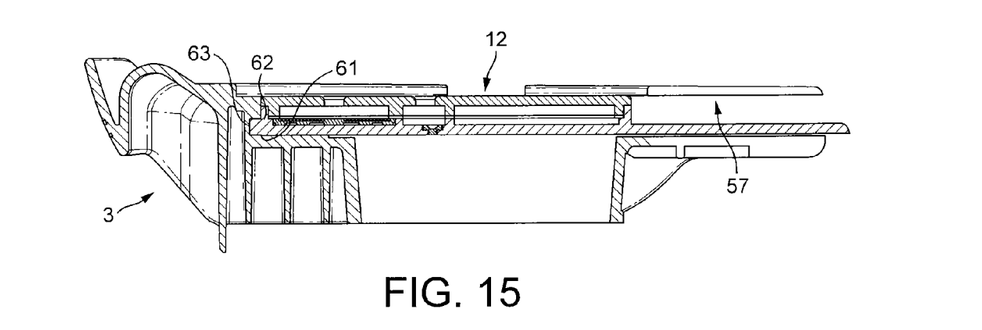
FIG. 15 shows, in longitudinal cross sectional view a container holder according to another variant of the invention.
Figure 16:
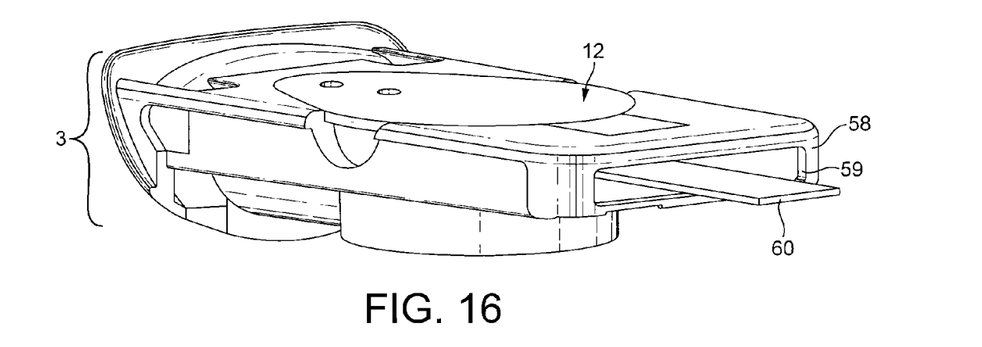
FIG. 16 shows in perspective view a container holder of FIG. 15.

FIGS. 15 and 16 illustrate another embodiment for the container holder 3 of the invention. In this embodiment, the filtration unit 12 is connected in the dedicated housing of the container holder as a slider fitting in translational relationship with a guiding opening 57 of the holder. The guiding opening comprises a window 59 which is formed in the front side 58 of the holder. The filtration unit comprises a handling portion 60 which protrudes outwardly of the front side 58 of the holder to enable the withdrawal of the filtration unit. The filtration unit can be secured in position against a lifting force, at its front end 61, opposite the handling portion, by a neck portion 62 fitting in a recess 63 of the container holder 3. In this example, the liquid outlet can be formed by a simple aperture in the casing without injection needle or by a retractable needle (not illustrated) to facilitate the sliding insertion of the filtration unit in the holder.

It should be noted that the embodiments of the present invention can be combined in many different ways. For instance, the drawer-like removable filter of the third embodiment can be used in a stand-alone filtration unit, i.e., a filtration unit which is not partially connected to the container holder such as by an hinge. Also, the stand-alone filtration unit of the first embodiment could be made of two covers which are partially separable such by a hinge or equivalent.

The invention claimed is:

1. A filtration unit for use in a nutritional liquid preparation machine using a container for preparing a beverage, the filtration unit comprising:
    a removable, disposable filter; and
    a re-usable protective casing encompassing the filter, said protective casing comprising:
        an outlet wall with at least one liquid outlet for delivering filtered liquid to the container in the container holder, wherein the at least one liquid outlet comprises a perforating member protruding from the outlet wall, and wherein the perforating member comprises a hollow needle and provides a liquid inlet through a sealing membrane of the container for allowing filtered liquid to be fed in the container; and
        an inlet wall with at least one liquid inlet, wherein the inlet wall of the protective casing further comprises a gas inlet for receiving a gas injector of the beverage machine, and wherein the gas inlet is axially offset relative to the liquid inlet and in fluid communication with the liquid outlet;
    wherein the protective casing is formed by a first cover forming the inlet wall and a second cover forming the outlet wall, the first cover and the second cover being at least partially detachable from one another to enable different removable filters to be placed in a dedicated compartment of the protective casing;
    wherein the filter is arranged in a removable manner in the protective casing; and
    wherein the filtration unit is adapted to engage a container holder intended to be inserted in the nutritional liquid preparation machine.

2. The filtration unit of claim 1, wherein the filter comprises a filter media associated to a reinforcement support.

3. The filtration unit of claim 2, wherein the reinforcement support is placed against an outlet side of the filter media.

4. The filtration unit of claim 2, wherein means for liquid-tight sealing are arranged in the protective casing to ensure a liquid-tight sealing arrangement between the inlet side of the filter and the outlet side of the filter.

5. The filtration unit of claim 2, wherein the protective casing comprises an open window arranged to slidably receive the filter therein.

6. The filtration unit of claim 2, wherein the filter is housed in a dedicated compartment of the protective casing which is axially offset relative to the axis of the liquid outlet.

7. The filtration unit of claim 1, wherein the first cover and the second cover are guided with respect to one another in opening of the protective casing by at least one of a hinge, a transversal connection means, and rotational connection means.

8. The filtration unit of claim 1, wherein the sealing membrane comprises a sealing foil.

9. An assembly for insertion in a nutritional liquid preparation machine, comprising:
    a filtration unit adapted to engage a container holder intended to be inserted in the machine, said filtration unit comprising:
        a removable, disposable filter; and
        a re-usable protective casing encompassing the filter, said protective casing comprising:
            an outlet wall with at least one liquid outlet for delivering filtered liquid to the container in the container holder, wherein the at least one liquid outlet comprises a perforating member protruding from the outlet wall, and wherein the perforating member comprises a hollow needle and provides a liquid inlet through a sealing membrane of the container for allowing filtered liquid to be fed in the container; and
            an inlet wall with at least one liquid inlet, wherein the inlet wall of the protective casing further comprises a gas inlet for receiving a gas injector of the beverage machine, and wherein the gas inlet is axially offset relative to the liquid inlet and in fluid communication with the liquid outlet; and wherein the protective casing is formed by a first cover forming the inlet wall and a second cover forming the outlet wall, the first cover and the second cover being at least partially detachable from one another to enable different removable filters to be placed in a dedicated compartment of the protective casing; and wherein the filter is arranged in a removable manner in the protective casing;

a container holder for the preparation of a nutritional liquid and having a container receiving seat; and a container comprising:
  a body containing nutritional ingredients, said body being sized to fit in the container receiving seat of the container holder; and
  a top wall adapted for being sealingly engaged by the filtration unit.

10. The assembly of claim 9, wherein the container holder further comprises a housing dedicated for receiving the filtration unit therein and wherein the protective casing of the filtration unit is sized and dimensioned to complementarily fit in the said housing in a moveable or removable manner.

11. The assembly of claim 10, wherein the filtration unit is connected to the container holder in a moveable manner.

12. The assembly of claim 11, wherein the filtration unit is connected to the container holder to be movable between a first position in which the container receiving seat of the holder is uncovered for enabling the loading and unloading of the container in the container holder and a second position in which the container receiving seat is covered for enabling the liquid outlet of the unit to be positioned at the inlet side of the container when a container is present in the container holder.

13. The assembly of claim 12, further comprising a latch to releasably secure the filtration unit in the second position.

14. The assembly of claim 13, wherein the latch extends by an actuation member placed at or close to a handle of the container holder.

15. The assembly of claim 9, wherein the sealing membrane comprises a sealing foil.

16. A filtration kit, comprising:
  a plurality of filters, wherein a filtering surface area of each filter within the plurality of filters differs; and
  at least one casing for enabling the constitution of a filtration unit for use in a nutritional liquid preparation machine using a container for preparing the beverage, the filtration unit being adapted to engage a container holder intended to be inserted in the machine, said filtration unit being obtained by the arrangement of a filter selected from the plurality of filters in the casing, said casing comprising an inlet wall with at least one liquid inlet and an outlet wall with at least one liquid outlet for delivering filtered liquid to the container in the container holder, wherein the at least one liquid outlet comprises a perforating member protruding from the outlet wall, wherein the perforating member comprises a hollow needle and provides a liquid inlet through a sealing membrane of the container for allowing filtered liquid to be fed in the container, wherein the protective casing is formed by a first cover forming the inlet wall and a second cover forming the outlet wall, the first cover and the second cover being at least partially detachable from one another to enable the filter to be placed in a dedicated compartment of the protective casing, and wherein the inlet wall of the protective casing further comprises a gas inlet for receiving a gas injector of the beverage machine, and wherein the gas inlet is axially offset relative to the liquid inlet and in fluid communication with the liquid outlet; and wherein each filter of the plurality of filters can be arranged in a removable manner in the casing, thereby allowing the user to select one filter within the plurality of filters for its arrangement in the casing.

17. A method of producing an assembly for insertion in a nutritional liquid preparation machine, the method comprising the steps of:
  connecting the filtration unit of claim 8 to a container holder, wherein the container holder comprises a container receiving seat; and
  loading a container in the container receiving seat of the container holder, the container comprising a body containing nutritional ingredients, and the container further comprising a top wall that is sealingly engaged by the filtration unit.

18. The filtration unit of claim 1, wherein the filter is arranged in a removable manner in the protective casing such that a size of the filter can be adapted based on filtering needs.

19. The assembly of claim 9, wherein the filter is arranged in a removable manner in the protective casing such that a size of the filter can be adapted based on filtering needs.

* * * * *